United States Patent
May et al.

(10) Patent No.: US 10,869,343 B2
(45) Date of Patent: Dec. 15, 2020

(54) METHOD FOR CONNECTING A MACHINE TO A WIRELESS NETWORK

(71) Applicant: Robert Bosch GmbH, Stuttgart (DE)

(72) Inventors: Gunther May, Karlstadt (DE); Steven Dietrich, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/545,705

(22) Filed: Aug. 20, 2019

(65) Prior Publication Data

US 2020/0068629 A1 Feb. 27, 2020

(30) Foreign Application Priority Data

Aug. 22, 2018 (DE) .......................... 10 2018 214 144

(51) Int. Cl.
*H04L 12/24* (2006.01)
*H04W 76/10* (2018.01)
*H04L 29/08* (2006.01)

(52) U.S. Cl.
CPC ............. *H04W 76/10* (2018.02); *H04L 41/08* (2013.01); *H04L 67/10* (2013.01)

(58) Field of Classification Search
CPC ...... H04W 76/10; H04W 16/14; H04L 41/08; H04L 67/10; H04L 41/0886; H04L 41/12
See application file for complete search history.

(56) References Cited

U.S. PATENT DOCUMENTS

2019/0306024 A1* 10/2019 Petria ..................... H04L 67/34
2019/0350023 A1* 11/2019 Novlan .................... H04L 5/16
2019/0394643 A1* 12/2019 Townend .......... H04W 12/0407

* cited by examiner

*Primary Examiner* — Kim T Nguyen
(74) *Attorney, Agent, or Firm* — Maginot, Moore & Beck LLP

(57) ABSTRACT

The disclosure relates to a method for connecting a machine having a multiplicity of machine components to a wireless network, wherein configuration data are generated having information about the multiplicity of machine components and how the latter are to be networked to one another, wherein the configuration data are transmitted to the wireless network, wherein a subnetwork of the wireless network is set up on the basis of the configuration data for the multiplicity of machine components and wherein the machine is connected to the subnetwork of the wireless network.

20 Claims, 3 Drawing Sheets

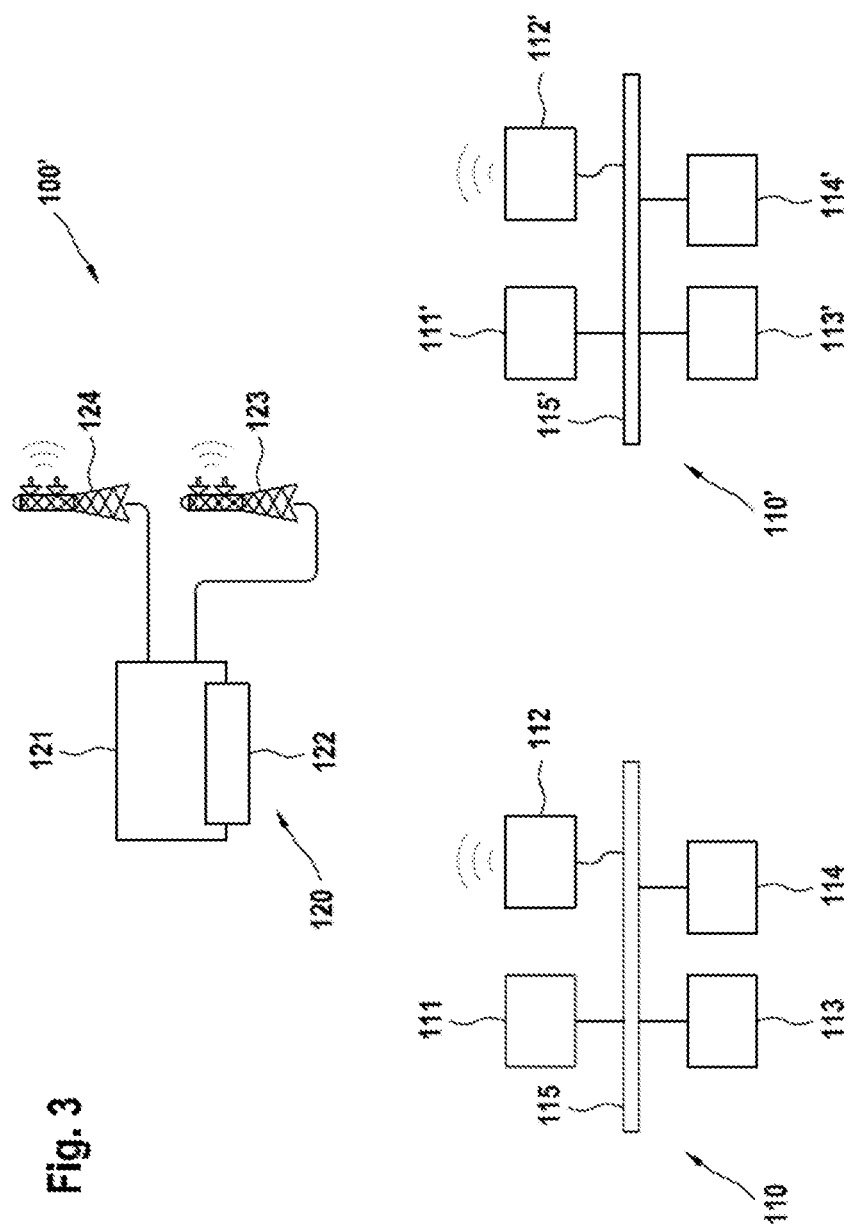

METHOD FOR CONNECTING A MACHINE TO A WIRELESS NETWORK

This application claims priority under 35 U.S.C. § 119 to application no. DE 10 2018 214 144.4, filed on Aug. 22, 2018 in Germany, the disclosure of which is incorporated herein by reference in its entirety.

TECHNICAL FIELD

The present disclosure relates to methods for connecting a machine having a multiplicity of machine components to a wireless network, and to a computing unit, a system and a computer program for performing said methods.

BACKGROUND

In automation engineering or industrial control engineering, it is customary to connect components of a machine or installation, in particular control units and field devices, such as e.g. electrical controllers, drive controllers, I/O devices, etc., to one another in a network. For the networking of machines, for example in the field of automation engineering, the term "Industry 4.0" is now common. This is intended to be understood to mean the networking of machines or installations and in particular also the connection of said machines or installations to the Internet or the Internet of Things (known as IoT). Networked devices in this context can be sensors and security cameras through to vehicles and production machines. By way of example, there is the possibility in this case of connecting a machine for instance to other machines or else to a remote computing unit system (known as Cloud computing or Edge computing) via the Internet.

SUMMARY

Against this background, methods for connecting a machine to a wireless network and also a computing unit, a system and a computer program for performing said methods having the features of the disclosure are proposed. Advantageous refinements are the subject matter of the particular embodiments and of the description below.

The machine has a multiplicity of machine components. These machine components may for instance already be networked to one another via a different network, in particular a wired network. Similarly, it is possible for there to be no networking of the machine components to one another yet and for said networking to be supposed to be produced via the wireless network. The machine is supposed to be connected to a wireless network, in particular to a mobile radio network, furthermore in particular to the Internet. The wireless network can be used to network the machine or the machine components in particular to further components.

The method involves configuration data being generated having information about the multiplicity of machine components and how the latter are to be networked to one another. These configuration data are transmitted to the wireless network. A subnetwork of the wireless network is then automatically set up on the basis of the configuration data for the multiplicity of machine components and the machine is connected to this subnetwork.

These configuration data can contain in particular information about properties of the intended data traffic that is important for the configuration of the wireless network, for instance volumes of data to be transferred, temporal demands on (realtime) transfer, priorities, demands on synchronism, robustness and data integrity. Further, the configuration data comprise in particular specific information relating to the individual machine components, for instance properties such as for example the actual, specific type of the individual machine component, and also furthermore in particular information relating to the networking of the individual machine components to one another, in particular which machine components communicate with one another for operation of the machine and how each of these communications proceeds, e.g. whether these communications each take place in real time, etc. The machine therefore brings along in particular information about how the individual machine components are to be connected to the wireless network.

The configuration data can be generated in particular in a specific machine component of the machine, for instance in a specific control unit intended for making the connection to the wireless network and furthermore in particular for controlling the machine. In particular, the configuration data can be transmitted to a specific unit or to a specific subscriber in the wireless network, for instance to a configuration unit configured for managing the wireless network. On receiving the configuration data, this configuration unit of the wireless network can cooperate in particular with the control unit of the machine in order to set up the subnetwork.

On the basis of the received configuration data, it is therefore known in the wireless network how the machine or the individual machine components are to be connected to the wireless network. In particular, applicable resources required for this configuration can be provided in the wireless network, in particular by the applicable configuration unit.

The subnetwork of the wireless network is intended to be understood in particular as a subnetwork that can be operated in particular independently of further subscribers of the wireless network, in particular independently of possible further subnetworks. In particular, the subnetwork is a local, physically bounded subnetwork that is set up specifically for the machine and its machine components.

The wireless network allows in particular the mutually independent subnetworks of this kind to be set up, in particular in the course of what is known as "network slicing". This "network slicing" has been formulated in particular in the course of the development of the mobile radio system 5G and allows a multiplicity of subnetworks or what are known as "network slices" to be managed and operated via a common physical network infrastructure. The subnetworks can be real subnetworks in this case that are particularly physically separate from one another and for each of which there is provision for individual, mutually independent, hardware elements of their own. Similarly, it is possible for the subnetworks to be virtual subnetworks that use in particular the same hardware elements and are expediently separate from one another by virtue of suitable software measures. In particular, partitioning of the wireless network and of its resources is rendered possible in this case. The individual subnetworks can expediently have different individual properties matched to the respective actual application, for example individual data rates, speeds, capacities, etc.

In the course of the present method, a subnetwork is set up for the machine in particular in the course of "network slicing", with the actual, individual properties required for the specific application of the machine, as are described in the configuration data. In particular, a common subnetwork or a common "network slice" is set up for all of the machine components of the machine. If for instance multiple different machines are connected to the wireless network, there can therefore be provision made for in particular an individual subnetwork for each of the machines. Similarly, it is conceivable for particular machine components to be combined in a subnetwork or "network slice", for instance all controllers of the machine or machine components of the same type, e.g. all controllers of the same type. Therefore, it is also possible for multiple subnetworks to be set up for one machine.

The present method allows in particular the machine to be networked via the wireless network in the course of what is known as "Industry 4.0" and in particular to be connected to the Internet or the "Internet of Things" (known as IoT). The machine can communicate by means of the method via the Internet or Internet of Things for instance with other machines, or for instance also with remote computing units such as a servers or what is known as a Cloud. The networking of machines in the course of "Industry 4.0" now plays a large part, as does wireless communication or the wireless connection of machines to the Internet of Things, which the method allows in a low-sophistication, effective manner.

In particular, the configuration or setup of the subnetwork, expediently in the course of "network slicing", is rendered possible in an automatic manner in the course of the method. The configuration data are in particular automatically generated by the machine or may already be present in the machine anyway. The transmission of the configuration data to the wireless network and the setup of the subnetwork on the basis of the configuration data expediently likewise take place automatically, in particular by means of the applicable control unit of the machine and the configuration unit of the wireless network.

The machine can therefore automatically be connected to the wireless network, so that in particular no or at least hardly any intervention by a user is necessary. In particular, no expert knowledge is therefore needed and a sophistication of configuration is kept as low as possible. In particular, the method allows automatic splitting of the wireless network into multiple parallel local subnetworks or "network slices", which do not influence one another, for different machines. Each of these machines brings along in each case the applicable configuration data for the applicable subnetwork automatically. The configuration data can be generated by the machine for instance automatically in particular when the machine is started up. Similarly, it is conceivable for the configuration data to be already prescribed in the machine and to have been deposited in the machine for instance in the course of a manufacturing process.

According to a particularly preferred embodiment, the wireless network is a mobile radio network, preferably a realtime-compatible mobile radio network, preferably based on 5G standards. Radio communication is still used a little in conventional machines and is usually performed on the basis of standards according to WiFi, Bluetooth or IEEE 802.15.4. Mobile radio networks, in particular based on the standards 4G and 5G, have significant advantages over such radio communication mechanisms as are of great importance for industrial applications, however, in particular a markedly improved realtime behavior, a higher level of robustness and the possibility of setting up subnetworks in the course of "network slicing". The present method allows such connection of the machine to the Internet or the Internet of Things via a mobile radio network in particular in the course of "Industry 4.0" in a low-sophistication, effective manner. The use of radio communication for industrial applications is therefore markedly simplified by the method.

After UMTS (3G) and LTE (4G), 5G is the fifth generation of what are known as "Next Generation Mobile Networks' (NGMN for short), a project from mobile radio companies and mobile radio equipment suppliers for the development of mobile radio generations. 5G is based on its direct predecessor 4G, but has significant improvements in comparison therewith, in particular a markedly improved realtime behavior and the possibility of setting up subnetworks in the course of "network slicing". In the years to come, it will therefore be of great importance for industrial applications, in the course of the advancing development of "Industry 4.0" and the Internet of Things, and in the course of the changeover of mobile radio networks from 4G to 5G standards, to be able to connect machines to the Internet or the Internet of Things via 5G mobile radio network. The present method allows such connection of the machine to the Internet or the Internet of Things via a mobile radio network, in particular according to the 5G standards, in particular as "Industry 4.0", in a low-sophistication, effective manner.

Advantageously, the configuration data are generated by virtue of component-specific information being received or read from each of the machine components. This component-specific information relates in particular to the individual machine components and their respective configuration for operation in the wireless network or in the machine. The machine components therefore themselves bring along information or data for the configuration thereof, for operation in the machine or in the wireless network. In particular, the individual machine components can transmit their respective component-specific information automatically to the control unit of the machine that is also intended to set up the subnetwork when the machine components are connected to this control unit. Similarly, it is conceivable for the control unit to automatically read or demand the applicable component-specific information when machine components are connected to the control unit.

Preferably, the configuration data are generated on the basis of the received component-specific information and in particular furthermore on the basis of application-specific information concerning applications to be executed by the machine. This application-specific information describes in particular application demands according to which the applicable applications are to be executed by the machine, for instance which machine components communicate with one another in what way to execute the applications. In particular, this application-specific information is predetermined information deposited in the machine, which can be stored in the machine for instance in the course of the manufacturing process. Expediently, the application-specific information is deposited in the control unit of the machine that is also intended to set up the subnetwork. The application-specific information is in particular present in the machine anyway and is required for regular operation of the machine.

The configuration data can be generated for instance by virtue of the component-specific information of the individual machine components and the application-specific information being translated into a format or converted such that it is understood by the wireless network or by the configuration unit of the wireless network. By way of example, the configuration data can furthermore be generated on the basis of network-specific information concerning properties of the wireless network. This network-specific information can be used for instance to translate the component-specific information and the application-specific information so as to be accordingly comprehensible to the wireless network.

Advantageously, reception of the configuration data is followed by a check being performed to ascertain whether resources according to the configuration data are available in the wireless network. Therefore, a check is performed in particular to ascertain whether the subnetwork demanded by the machine is also realizable and can be set up or whether the accordingly required resources of the wireless network have for instance already been allocated for other subnetworks. In particular, the configuration unit of the wireless network can perform this check.

Preferably, if resources according to the configuration data are available in the wireless network, these available resources are used to set up the subnetwork according to the configuration data. In particular, the configuration unit of the wireless network can for this purpose provide the applicable control unit of the machine with the resources and for instance provide notification of applicable parameters of the resources, such as network addresses, identifiers, encryptions, etc.

If resources according to the configuration data are not or at least not completely available in the wireless network, a limited subnetwork is advantageously set up according to the available resources. By way of example, the control unit of the machine can in this case demand a less resource-intensive subnetwork or a less resource-intensive "network slice" in the wireless network. In particular, the limited subnetwork is set up such that it has as accurate a coverage as possible with the required demands according to the configuration data. By way of example, the control unit of the machine can for this purpose negotiate the available resources with the configuration unit of the wireless network. For example the control unit can in this case provide the configuration unit with notification of which resources are particularly important for the execution of the machine applications and which in turn are of lesser importance. Therefore, the control unit and the configuration unit can expediently set up the applicable limited subnetwork in cooperation such that it meets the most important demands and the individual machine applications can be executed correctly.

Preferably, the configuration data are transmitted to a configuration unit of the wireless network. As mentioned above, this configuration unit can communicate in particular with an applicable control unit of the machine to set up the subnetwork.

Preferably, the configuration unit can be a control unit of the wireless network, e.g. can be a network manager intended to manage the wireless network and new network subscribers. By way of example, the machine or the control unit of the machine can in this case have the configuration data available in the form of a file, e.g. in XML format, and can transmit said configuration data to the network manager or the control unit of the wireless network. It is then possible for the network manager to provide an applicable subnetwork having as accurate a coverage of the required demands as possible.

Alternatively or additionally, the configuration unit can preferably be a configuration interface or a programming interface (Application Programming Interface, API). The machine or the control unit of the machine can in this case expediently access the configuration interface, and properties of the subnetwork can be configured or negotiated on the basis of the demands according to the configuration data and the available resources in the wireless network.

Advantageously, the configuration data comprise demands on cyclic data traffic and/or demands on acyclic data traffic as information. In the case of cyclic data transfer, the transfer of data takes place in communication cycles, with a number of individual data packets (what are known as "messages") usually being transferred within one cycle. The time between the beginning of adjacent cycles is referred to as the cycle time and is for the most part constant. Cyclic data transfer is usually used for transferring time-critical data, i.e. data that need to be transferred securely in a particular time. By way of example, cyclic data transfer can be used for controlling actuators when the latter need to perform a predetermined action at a predetermined time (e.g. in the case of processing machines such as machine tools, printing machines, etc.). By contrast, in the case of acyclic data transfer, the transfer of the individual data packets takes place without time restriction. Acyclic data transfer is usually used to transfer non-time-critical data. As demands on cyclic data traffic, the configuration data can comprise for instance the cycle times and also the volumes of data in the data to be transferred in the individual cycles.

Alternatively or additionally, the configuration data preferably comprise a required robustness and/or a criticality of data transfers as information. By way of example, data transfers or data packets to be transferred can be prioritized differently in this case, so that priority can be granted to critical or realtime critical, higher-priority data packets in situations with increased load.

Alternatively or additionally, the configuration data preferably comprise specifications of a data or information interface in the machine to the outside. In particular, this data or information interface can be used to transfer data from the machine via the wireless network to other subscribers of the wireless network, for instance to a remote computing unit, e.g. to a server or a Cloud, or to another machine.

Alternatively or additionally, the configuration data can advantageously comprise security demands and/or safety demands as information. Security demands relate in particular to information security or security against attacks for the machine in this case. Safety demands relate in particular to a functional safety or dependability of the machine.

Alternatively or additionally, the configuration data can comprise a specification from one or more data streams that are supposed to be transmitted via the wireless network, such as for instance packet sizes, data rate requirement, relative or absolute priorities or required synchronisms or dependencies, as information. Further, the configuration data can alternately or additionally comprise properties or parameters or attributes of the wireless network, for example data rate, frequency range, transmission power, guard intervals, roaming, transmission intervals, synchronization information, error rate, etc., as information.

Advantageously, the machine components are additionally networked to one another via a wired, in particular realtime-compatible network that is preferably based on Ethernet and/or on IEEE 802 standards and/or on TSN standards. In particular, the machine components in this case are networked to one another via this wired network in the course of the automation engineering or the industrial control engineering. So that for instance movements of different units of the machine can proceed in sync and in a manner coordinated to one another, it is important for a data transfer between the individual machine components networked to one another to be able to take place in real time. Realtime-compatible in this case means that transferred data reach or have reached the desired subscriber at a definable time. Expediently, this wired, realtime-compatible network is an Ethernet-based realtime-compatible fieldbus, e.g. Sercos III, EtherCAT, PROFINET, EtherNET/IP, etc. IEEE 802 includes a series of norms or standards in the field of local, in particular wired, networks, in particular Ethernet networks. "Time Sensitive Networking" (TSN) is a series of standards or norms that are concerned among other things with the synchronization of network subscribers in a network, in particular in order to meet realtime demands, in particular for data transfer via Ethernet. TSN standards are becoming increasingly important in the course of Industry 4.0.

The method allows such a machine whose machine components, by means of a wired, realtime-compatible network, in particular by means of a fieldbus, to be connected to the Internet or the Internet of Things via the wireless network, in particular a mobile radio network, in particular in the course of "Industry 4.0". In the case of a realtime-compatible mobile radio network, preferably according to 4G or 5G standards, it is therefore in particular rendered possible to perform a realtime-compatible data transfer between the machine or between individual machine components and further subscribers in the wireless network, for example with other machines or remote computing units.

According to a preferred embodiment, the machine is connected to a remote computing unit and/or to one or more other machines via the wireless network. In particular, the machine can therefore be networked to other machines or to machine components of other machines via the wireless network, in particular in the course of "Industry 4.0", for example so that controllers of different machines can communicate with one another. The other machines may for instance each also be connected to the wireless network via an individual subnetwork in this case. Further, it is rendered possible to connect the machine to a remote computing unit or to a remote computing unit system (known as Cloud computing or Edge computing). By way of example, the wireless network can therefore be used to close open-loop or closed-loop control circuits by means of Cloud or Edge computing. The remote computing unit may be connected to the wireless network via the same subnetwork in this case or in particular also via a separate individual subnetwork.

The method is advantageously suitable for a wide bandwidth of machines and applications, for example for tunnel boring machines, hydraulic punches/presses, general automation systems, semiconductor handling, robotics, etc. Advantageously, the method is suitable for machine tools, such as for instance a welding system, a screwing system, a wire saw or a milling machine, for web processing machines, such as e.g. a printing machine, a newspaper printing machine, an intaglio printing machine, a screen printing machine, an inline flexographic printing machine or a packaging machine to be designed, or else for (belt) installations for manufacturing an automobile or for manufacturing components of an automobile (e.g. internal combustion engines or controllers).

Further, the method is advantageously suitable for various machines that can be connected to the Internet or the Internet of Things, for instance for household appliances of a private household (e.g. refrigerators, washing machines, televisions or components of home automation), for what are known as "smart devices" (e.g. portable handheld devices such as smartphones or as a tablet PCs) or else for vehicles that can communicate with one another via the Internet of Things, for example in order to detect hazards in road traffic early and to be able to exchange this information with other vehicles in real time.

The machine components can be for instance manipulators, I/O devices, motors, sensors, actuators and/or control units. Control units may for instance be in the form of a CNC (Computerized Numerical Control) controller, NC (Numerical Control) controller, Programmable Logic Controller (PLC) and/or Motion Logic Controller (MC—Motion Control).

A computing unit according to the disclosure, e.g. a control unit of a printing machine, is, in particular by programming, configured to perform a machine-based or network-based method according to the disclosure.

Further, the disclosure relates to a system having a machine and a wireless network. Advantages and advantageous refinements of the method according to the disclosure and of the computing unit according to the disclosure and of the system according to the disclosure will emerge from the present description in analogous fashion. The machine comprises a multiplicity of machine components and a preferred refinement of a computing unit according to the disclosure. The wireless network comprises at least one network subscriber, in particular in the form of a remote computing unit and/or in the form of at least one second machine, and a preferred refinement of a computing unit according to the disclosure. The wireless network is particularly preferably in the form of a mobile radio network, in particular in the form of a realtime-compatible mobile radio network, preferably based on 5G standards. The system therefore relates in particular to a machine that is connected to the Internet or the Internet of Things via a mobile radio network and can communicate with network subscribers such as other machines or remote computing units.

The implementation of the method in the form of a computer program is also advantageous, because it gives rise to particularly low costs, in particular when an executing controller is also used for other tasks and is therefore present anyway. Suitable data carriers for providing the computer program are in particular magnetic, optical and electrical memories, such as e.g. hard disks, flash memories, EEPROMs, DVDs, and so on. Download of a program via computer networks (Internet, intranet, etc.) is also possible.

Further advantages and refinements of the method will emerge from the description and the accompanying drawing.

It goes without saying that the features cited above and those yet to be explained below are able to be used not only in the respectively indicated combination but also in other combinations or on their own without departing from the scope of the present disclosure.

BRIEF DESCRIPTION OF THE DRAWINGS

The method is schematically depicted in the drawing on the basis of exemplary embodiments and is described in detail below with reference to the drawing.

In the drawings:

FIG. 3 schematically shows a system having a machine configured to perform a preferred embodiment of a method according to the disclosure.

DETAILED DESCRIPTION

Figure 1:
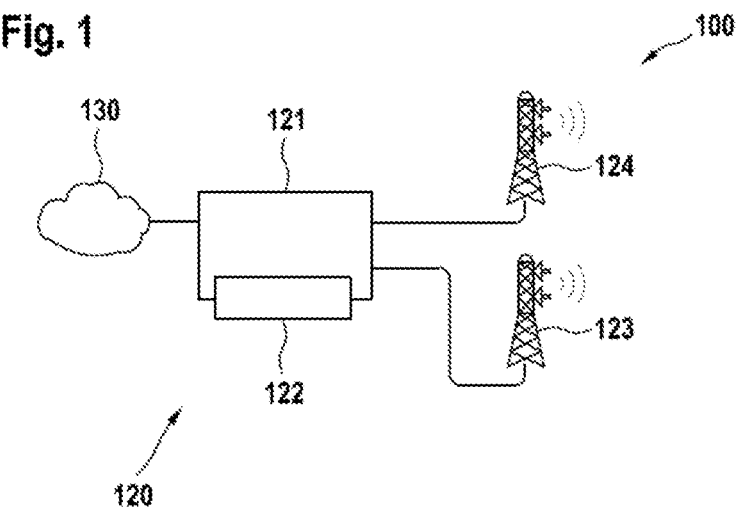
FIG. 1 schematically shows a system having a machine configured to perform a preferred embodiment of a method according to the disclosure.
Figure 1:
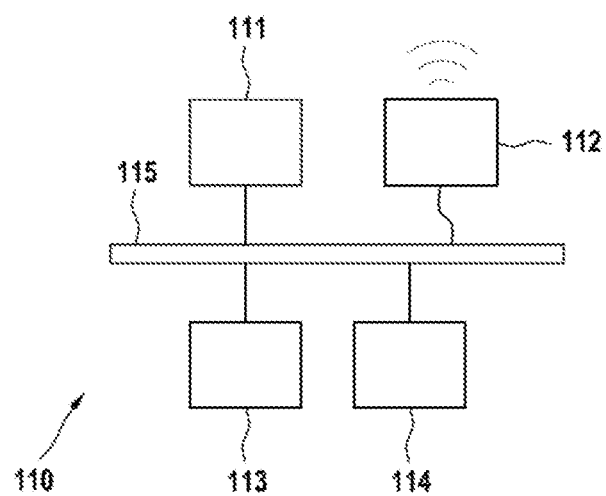

FIG. 1 schematically depicts a system 100 comprising a machine 110 and a wireless network 120.

The machine 110 has a multiplicity of machine components, for instance a control unit 111, a router 112, actuators 113 and sensors 114. It goes without saying that the machine 110 can also have further machine components, which are not depicted for the sake of clarity.

These machine components 111, 112, 113, 114 are networked to one another via a wired, realtime-compatible network 115 that is based on Ethernet, IEEE standards and further preferably on TSN standards. By way of example, the wired network 115 is an Ethernet-based realtime-compatible fieldbus, e.g. Sercos III, EtherCAT, PROFINET, EtherNET/IP, etc.

The machine 110 is further supposed to be connected to a wireless network 120, which is particularly preferably a mobile radio network, in particular according to 5G standards. The wireless network 120 can comprise for instance a multiplicity of transmission antennas or base stations 123, 124. In particular, the router 112 of the machine 110 can be intended to use such a base station 123 to connect to the mobile radio network 120.

The wireless network or the mobile radio network 120 further comprises a control unit or a network manager 121 and also a configuration interface or programming interface 122 (application programming interface, API).

In the course of "Industry 4.0", the machine 110 is supposed to be connected to the Internet or the Internet of Things (known as IoT) via the mobile radio network 120 and for instance connected to a remote computing unit 130 for what is known as Cloud computing.

The remote computing unit 130 (e.g. with a manufacturer, maintenance company, control center, etc.) is a network subscriber in the mobile radio network 120. It goes without saying that the mobile radio network 120 can also have further network subscribers, which are not depicted for the sake of clarity.

Figure 2:
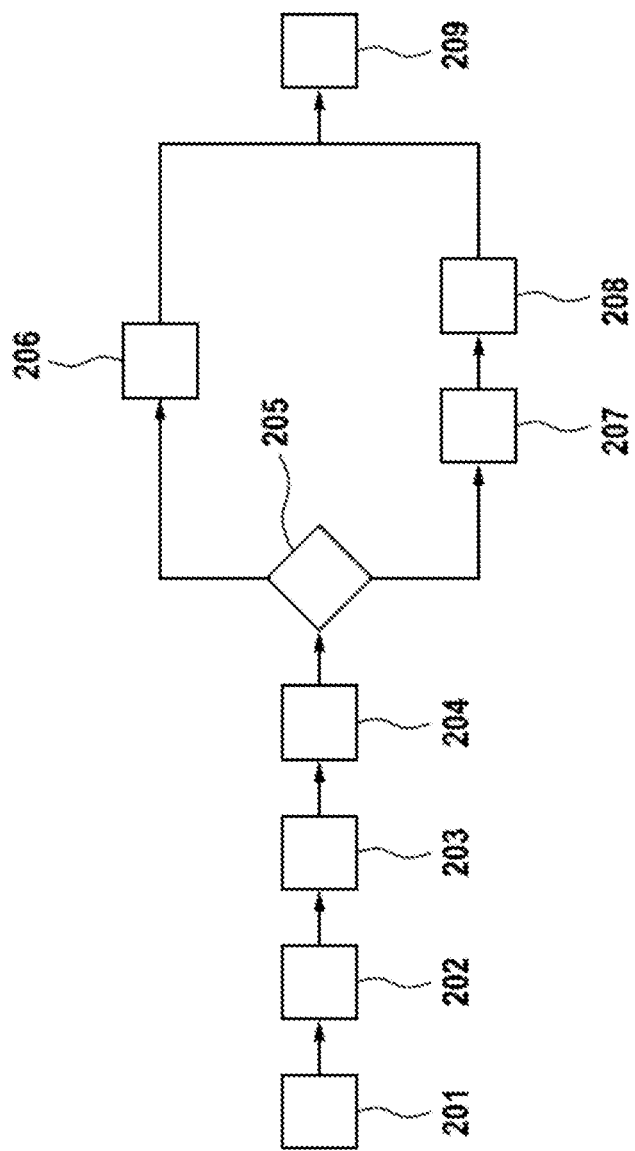
FIG. 2 schematically shows a preferred embodiment of a method according to the disclosure as a block diagram.

In order to connect the machine 110 to the mobile radio network 120 and in order therefore to allow communication with the remote computing unit 130, the control unit 111 of the machine 100 is, in particular by programming, configured to perform a preferred embodiment of a method according to the disclosure that is depicted schematically in FIG. 2 as a block diagram and is explained below with reference to FIGS. 1 and 2.

In step 201, application-specific information is generated that describes in particular application demands according to which applications are to be executed by the machine 110, for instance how the machine components 111, 112, 113, 114 communicate with one another to operate the machine 110. By way of example, this application-specific information may have been deposited in the control unit 111 in the course of a manufacturing process.

In step 202, the control unit 111 receives from each of the remaining machine components 112, 113, 114 component-specific information relating to the individual machine components 112, 113, 114 and their respective configuration for operation in the wireless network 120 or in the machine 110. By way of example, the individual machine components 112, 113, 114 can transmit their respective component-specific information automatically to the control unit 111 if the machine components 112, 113, 114 are connected to the control unit 111.

In step 203, the control unit 111 generates configuration data, in particular on the basis of the received component-specific information and on the basis of application-specific information. These configuration data comprise in particular specific information relating to the individual machine components 111, 112, 113, 114, in particular properties such as for example the actual, specific type of the individual machine component 111, 112, 113, 114 and in particular information relating to the networking of the individual machine components 111, 112, 113, 114 to one another, in particular which machine components communicate with one another for operation of the machine 110, and how each of these communications proceeds. By way of example, the configuration data can comprise demands on cyclic data traffic between the individual machine components 111, 112, 113, 114, and also a required robustness and criticality of such data transfers.

By way of example, the configuration data are generated by the control unit 111 by virtue of the component-specific information and the application-specific information being translated into a format or converted such that they are understood by the network manager 121 and the programming interface 122 of the mobile radio network 120. By way of example, the control unit 111 can generate the configuration data in the form of a file, e.g. in XML format.

By way of example, the control unit 111 may translate the component-specific information and the application-specific information by using network-specific information describing properties of the mobile radio network 120. Network-specific information of this kind can for instance likewise be deposited in the control unit 111 in the manufacturing process.

Such properties of the network can be for instance data rate, frequency range, transmission power, guard intervals, roaming, transmission intervals, synchronization information and error rate of the 5G mobile radio network 120.

The generated configuration data can comprise specifications about a data stream into the 5G network 120 and a further data stream out of the 5G network 120 for instance for each machine component 111, 112, 113, 114 as information. These data streams can each be described for instance by means of the parameters data rate, packet sizes, cyclic/acyclic communication, cycle time (for cyclic data) and priority.

In step 204, the configuration data are transmitted from the control unit 111 via the router 112 to the mobile radio network 120 or a configuration unit, for instance to the network manager 121 or to the programming interface 122.

In step 205, a check is performed, for instance by the network manager 121 or the programming interface 122, to ascertain whether there are resources in the mobile radio network 120, as are required according to the configuration data.

If this is the case, these resources are provided in step 206 and a subnetwork or a "network slice" is set up for the machine 110 or for the machine components 111, 112, 113, 114 in the course of what is known as "network slicing".

If the resources required according to the configuration data are not available in the mobile radio network 120, however, the control unit 111 communicates e.g. with the programming interface 122 in step 207 in order to negotiate on the available resources. The control unit 111 provides the programming interface 122 with notification for instance of which resources are needed particularly importantly for executing the machine applications. Therefore, a decision is taken in step 207 as to which resources are provided for the machine 110, in order to allow as accurate a coverage as possible with the required demands according to the configuration data.

In step 208, a limited subnetwork or a limited "network slice" is set up for the machine 110 or for the machine components 111, 112, 113, 114 in the course of "network slicing".

In step 209, the configuration is complete and the machine 110 is connected to a subnetwork of the mobile radio network 120. This subnetwork is intended to be understood as a subnetwork that can in particular be operated independently of further subscribers of the mobile radio network 120 such as the remote computing unit 130. The subnetwork may in this case be a virtual or else a real subnetwork. The subnetwork is in particular a local, physically bounded subnetwork configured specifically for the machine 110 and its machine components 111, 112, 113, 114. The remote computing unit 130 may for instance likewise be connected to the mobile radio network 120 via an individual subnetwork in the course of "network slicing".

The mobile radio network 120 based on 5G standards allows in particular a realtime-compatible data transfer. Therefore, a data transfer between the machine 110, in particular the controller 111, and the remote computing units 130 can be performed in real time, so that, for instance in the course of "Industry 4.0", open-loop and closed-loop control circuits of the machine 110 can be closed via the remote computing unit 130.

FIG. 3 schematically depicts, according to a preferred refinement of the disclosure, a system 100' that, analogously to the system shown in FIG. 1, comprises a machine 110 and a wireless network 120 in the form of a 5G mobile radio network. In FIGS. 1 and 3, identical reference signs denote the same elements.

Further, the system shows a further machine 110' as a further network subscriber in the mobile radio network 120. The example shown in FIG. 3 is a way of networking the machine 110 from FIG. 1 to a second machine 110', in particular in the course of "Industry 4.0", via the mobile radio network 120 and in particular via the Internet of Things as an alternative or in addition to the remote computing unit 130.

The second machine 110' can have, for instance analogously to the machine 100, a control unit 111', a router 112', actuators 113' and sensors 114' and if need be also further machine components. These machine components 111', 112', 113', 114' are also networked via a wired, realtime-compatible network 115', e.g. via an Ethernet-based realtime-compatible field bus, e.g. Sercos III, EtherCAT, PROFINET, EtherNET/IP, etc.

The machine 110' is connected, analogously to the machine 110, to the mobile radio network 120 via an individual subnetwork in the course of "network slicing", this subnetwork of the machines 110' being and in particular independent of the subnetwork of the machine 110.

The system 100' allows a data transfer, in particular in real time, from the machine 110 via the mobile radio network 120 to the machine 110', and vice versa. By way of example, the controllers 111 and 111' can communicate with one another, in particular in real time.

What is claimed is:

1. A method for connecting a machine having a plurality of machine components to a wireless network, the method comprising:
   generating configuration data having information about the plurality of machine components and how the plurality of machine components are to be networked to one another;
   transmitting the configuration data to the wireless network; and
   connecting the machine to a subnetwork of the wireless network that has been set up based on the configuration data.

2. The method according to claim 1, wherein the wireless network is a mobile radio network.

3. The method according to claim 2, wherein the mobile radio network is a realtime-compatible mobile radio network based on 5G standards.

4. The method according to claim 1, the generating the configuration data further comprising:
   generating the configuration data from component-specific information received from at least one of the plurality of machine components.

5. The method according to claim 1, the generating the configuration data further comprising:
   generating the configuration data from application-specific information concerning applications to be executed by the machine.

6. The method according to claim 1, the transmitting the configuration data further comprising:
   transmitting the configuration data to a configuration unit of the wireless network.

7. The method according to claim 6, wherein the configuration unit is at least one of a control unit and a configuration interface.

8. The method according to claim 1, wherein the method is performed by a computer.

9. A method for connecting a machine having a plurality of machine components to a wireless network, the method comprising:
   receiving configuration data having information about the plurality of machine components and how the plurality of machine components are to be networked to one another;
   setting up a subnetwork of the wireless network based on the configuration data; and
   connecting the machine to the subnetwork of the wireless network.

10. The method according to claim 9 further comprising:
    checking, after receiving the configuration data, whether resources according to the configuration data are available in the wireless network.

11. The method according to claim 10, the setting up the subnetwork further comprising:
    setting up the subnetwork using the resources according to the configuration data in response to the resources according to the configuration data being available in the wireless network.

12. The method according to claim 10, the setting up the subnetwork further comprising:
    setting up the subnetwork as a limited subnetwork using only a subset of the resources according to the configuration data in response to one or more of the resources according to the configuration data being unavailable in the wireless network.

13. The method according to claim 9, wherein the configuration data comprise at least one of the following pieces of information:
    demands on cyclic data traffic;
    demands on a cyclic data traffic;
    a required robustness of data transfers;
    a criticality of data transfers;
    specifications of a data interface of the machine to an outside;
    security demands;
    safety demands;
    specification from one or more data streams; and
    properties of the wireless network.

14. The method according to claim 9, the connecting the machine further comprising:

connecting the machine via the wireless network to at least one of (i) a remote computing unit and (ii) at least one further machine.

15. A system comprising:
a machine having a plurality of machine components and a first computer; and
a wireless network having at least one network subscriber and a second computer,
wherein the first computer is configured to (i) generate configuration data having information about the plurality of machine components and how the plurality of machine components are to be networked to one another, (ii) transmit the configuration data to the wireless network, and (iii) connect the machine to a subnetwork of the wireless network, and
wherein the second computer is configured to (i) receive the configuration data, (ii) set up the subnetwork of the wireless network based on the configuration data, and (iii) connect the machine to the subnetwork of the wireless network.

16. The system according to claim 15, wherein the plurality of machine components are networked to one another via a wired network.

17. The system according to claim 16, wherein the wired network is a realtime-compatible network based on at least one of Ethernet standards, IEEE802 standards, and TSN standards.

18. The system according to claim 15, wherein at least one of the first computer and the second computer execute a computer program.

19. The system according to claim 18, wherein the computer program is stored on a non-transitory machine-readable storage medium.

20. The system according to claim 15, wherein the at least one network subscriber is at least one of (i) a remote computing unit and (ii) at least another machine.

* * * * *